United States Patent
Lee et al.

(10) Patent No.: US 10,521,514 B2
(45) Date of Patent: Dec. 31, 2019

(54) INTEREST NOTIFICATION APPARATUS AND METHOD

(71) Applicant: Samsung Electronics Co., Ltd., Suwon-si (KR)

(72) Inventors: Ji Hyun Lee, Suwon-si (KR); Young Sang Choi, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/210,349

(22) Filed: Jul. 14, 2016

(65) Prior Publication Data
US 2017/0018272 A1    Jan. 19, 2017

(30) Foreign Application Priority Data

Jul. 16, 2015 (KR) .................. 10-2015-0101200

(51) Int. Cl.
| | | |
|---|---|---|
| G10L 15/22 | (2006.01) | |
| G06F 17/28 | (2006.01) | |
| G06F 3/16 | (2006.01) | |
| G10L 25/51 | (2013.01) | |
| G06Q 30/02 | (2012.01) | |
| H04N 21/466 | (2011.01) | |
| H04N 21/439 | (2011.01) | |
| H04N 21/45 | (2011.01) | |
| H04N 21/475 | (2011.01) | |
| G06F 16/9032 | (2019.01) | |
| G06F 16/683 | (2019.01) | |
| G06F 16/9535 | (2019.01) | |

(Continued)

(52) U.S. Cl.
CPC ......... *G06F 17/289* (2013.01); *G06F 16/685* (2019.01); *G06F 16/90332* (2019.01); *G06F 16/9535* (2019.01); *G06Q 30/02* (2013.01); *G10L 25/51* (2013.01); *H04N 21/4394* (2013.01); *H04N 21/4532* (2013.01); *H04N 21/4668* (2013.01); *H04N 21/4755* (2013.01); *G10L 15/26* (2013.01); *G10L 2015/088* (2013.01)

(58) Field of Classification Search
CPC ......... G10L 15/26; G10L 21/00; G10L 15/00; G10L 15/18; G06F 17/27
USPC ............................. 704/9, 235, 257, 270, 275
See application file for complete search history.

(56) References Cited

U.S. PATENT DOCUMENTS

| | | | | |
|---|---|---|---|---|
| 6,104,989 A | * | 8/2000 | Kanevsky | ........... G06F 17/2715 704/257 |
| 7,412,376 B2 | * | 8/2008 | Florencio | ................ G10L 25/87 370/470 |

(Continued)

FOREIGN PATENT DOCUMENTS

| | | |
|---|---|---|
| JP | 2010-197882 A | 9/2010 |
| KR | 10-2013-0089934 A | 8/2013 |

(Continued)

*Primary Examiner* — Seong-Ah A Shin
(74) *Attorney, Agent, or Firm* — NSIP Law

(57) ABSTRACT

An apparatus for notification of speech of interest to a user includes a voice analyzer configured to recognize speech, evaluate a relevance between a result of the speech recognition and a determined user's topic of interest, and determine whether to provide a notification; and an outputter configured to, in response to the voice analyzer determining to provide the notification, generate and output a notification message.

24 Claims, 8 Drawing Sheets

(51) Int. Cl.
*G10L 15/08* (2006.01)
*G10L 15/26* (2006.01)

(56) References Cited

U.S. PATENT DOCUMENTS

| | | | |
|---|---|---|---|
| 8,359,020 B2 | 1/2013 | Lebeau et al. | |
| 9,639,322 B2* | 5/2017 | Osawa | G01C 21/3608 |
| 2009/0225971 A1* | 9/2009 | Miller | H04M 3/42153 |
| | | | 379/202.01 |
| 2010/0312547 A1* | 12/2010 | Van Os | G06F 3/167 |
| | | | 704/9 |
| 2011/0060591 A1* | 3/2011 | Chanvez | H04M 3/2281 |
| | | | 704/270 |
| 2011/0271207 A1* | 11/2011 | Jones | H04W 4/21 |
| | | | 715/753 |
| 2012/0016678 A1* | 1/2012 | Gruber | G10L 15/22 |
| | | | 704/275 |
| 2012/0035924 A1 | 2/2012 | Jitkoff et al. | |
| 2012/0290950 A1* | 11/2012 | Rapaport | H04L 51/32 |
| | | | 715/753 |
| 2014/0164476 A1* | 6/2014 | Thomson | G06Q 10/101 |
| | | | 709/203 |
| 2014/0195230 A1* | 7/2014 | Han | G10L 15/22 |
| | | | 704/235 |
| 2014/0303960 A1* | 10/2014 | Orsini | G06F 17/2854 |
| | | | 704/2 |
| 2015/0019342 A1 | 1/2015 | Gupta | |
| 2015/0310862 A1* | 10/2015 | Dauphin | G10L 15/1815 |
| | | | 704/257 |
| 2016/0104480 A1* | 4/2016 | Sharifi | G10L 15/08 |
| | | | 704/254 |

FOREIGN PATENT DOCUMENTS

| | | |
|---|---|---|
| KR | 10-2013-0101505 A | 9/2013 |
| KR | 10-2014-0007512 A | 1/2014 |
| KR | 10-2014-0044015 A | 4/2014 |

* cited by examiner

FIG. 3

| CATEGORY 1_ LOCATION | CATEGORY 2_ SECURITY | CATEGORY 3_ EVENT | CATEGORY 4_ LEARNING |
|---|---|---|---|
| AIRPORT<br>BUS<br>SUBWAY<br>TRAIN<br>SHIP<br>AMUSEMENT PARK<br>... | EMERGENCY<br>EVACUATION<br>ESCAPE<br>911<br>FIRE<br>HELP ME<br>... | AIRPORT_ DELAYED ARRIVAL, DELAY, CHANGE<br>EVACUATION_ DISASTER, HURRICANE, FIRE, EARTHQUAKE<br>ESCAPE_ HALLWAY, EMERGENCY STAIRCASE, EMERGENCY EXIT<br>FIRE_ FIRE, FIRE STATION, EVACUATION<br>... | - AIRPORT_ THE DEPARTURE GATE FOR FLIGHT XXX DEPARTING AT YY:YY HAS BEEN CHANGED TO GATE □.<br>- BUS_ THE NEXT STOP IS XXX. GOLD COAST STATION<br>... |

USER'S TOPICS OF INTEREST

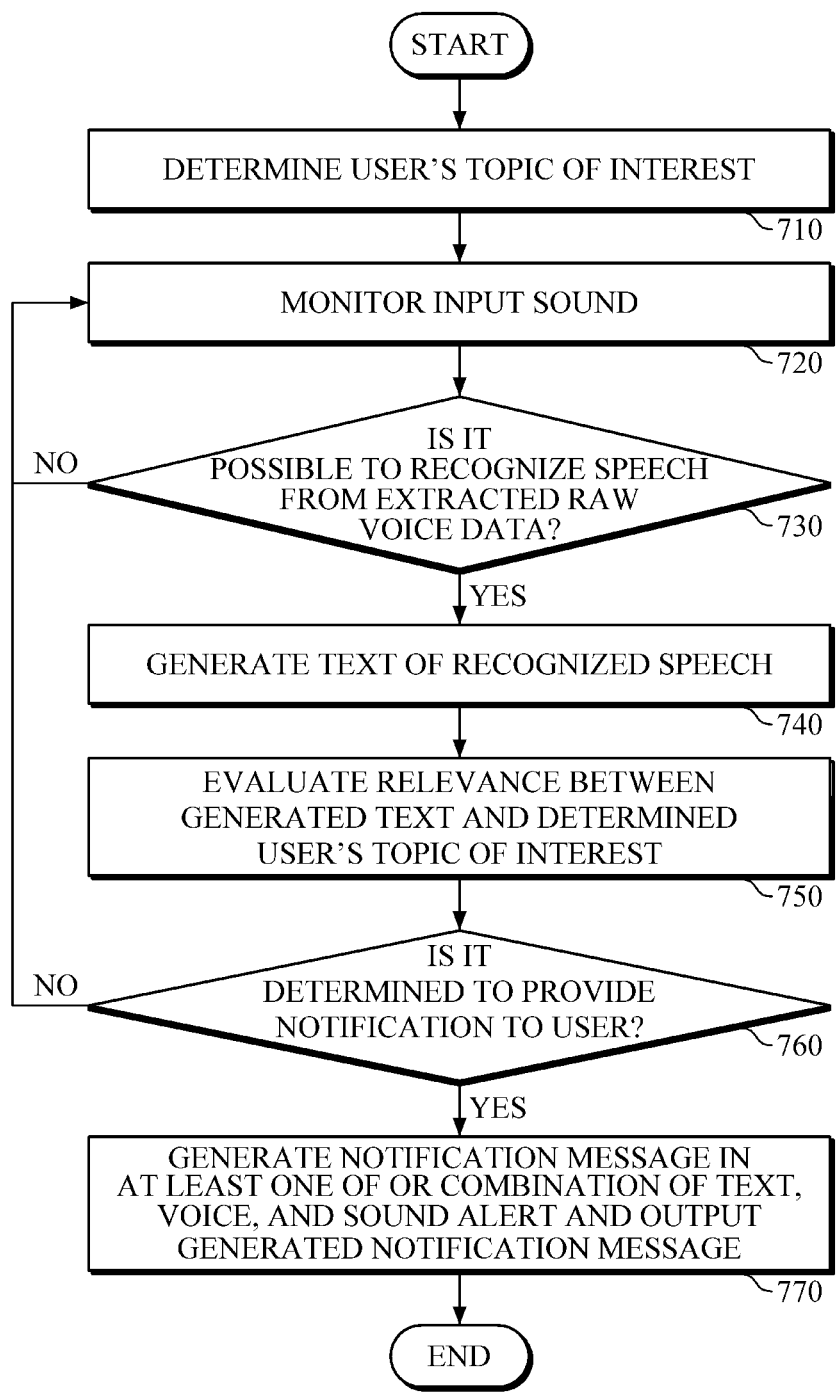

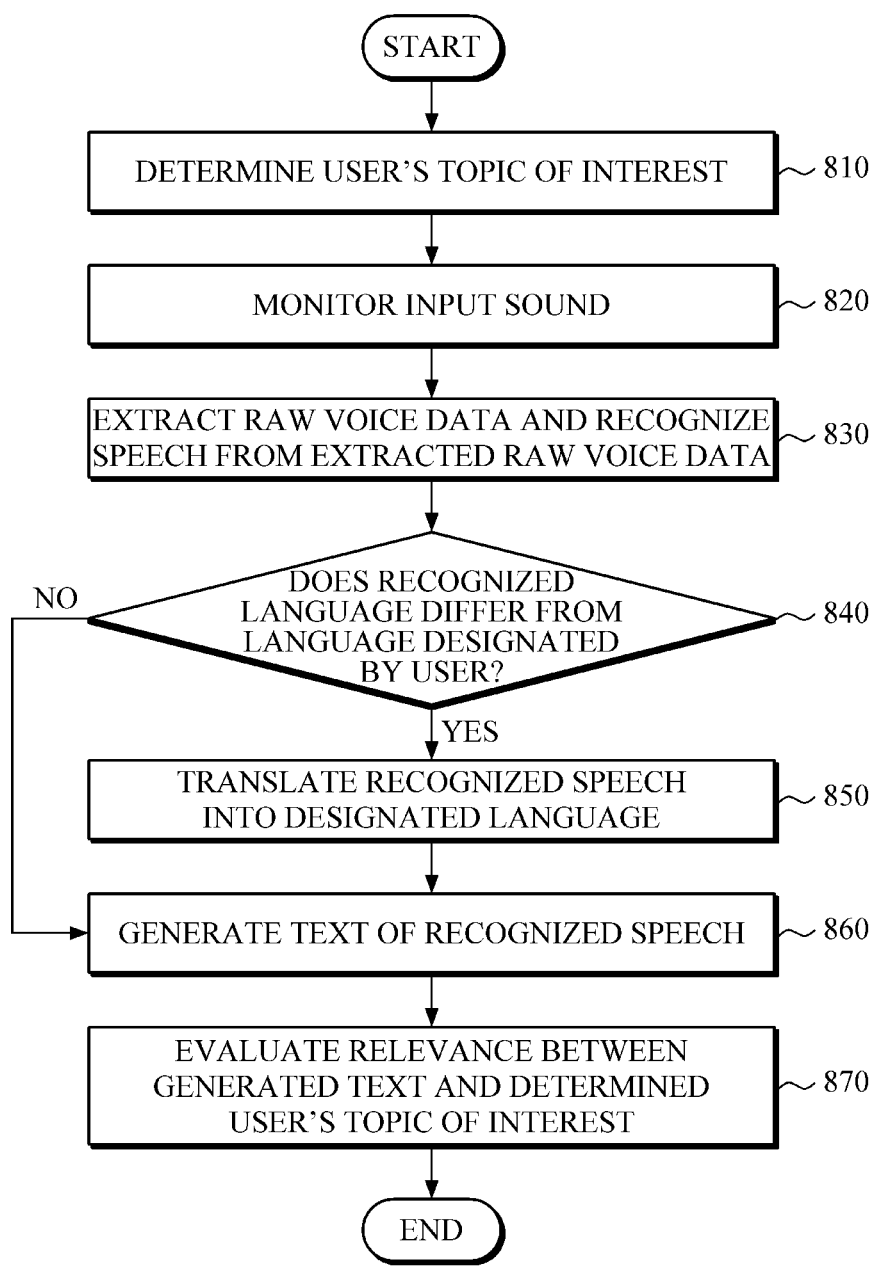

INTEREST NOTIFICATION APPARATUS AND METHOD

CROSS-REFERENCE TO RELATED APPLICATION(S)

This application claims the benefit under 35 USC 119(a) of Korean Patent Application No. 10-2015-0101200, filed on Jul. 16, 2015, in the Korean Intellectual Property Office, the entire disclosure of which is incorporated herein by reference for all purposes.

BACKGROUND

1. Field

The following description relates to technologies that recognize speech and provide appropriate corresponding information to a user.

2. Description of Related Art

Technologies related to context-aware recommendations exist, whereby users are presented with useful information for their convenience such as recommended advertisements or search results that were gained based on a user's contextual interaction with the underlying device.

Conventionally, information recommendations have been made by extracting information suitable to the user while using specific measures of recommendation performance, with such measures being based on data offered by service providers or by the user's peripheral devices.

The above technologies are, however, heretofore limited and have numerous failings, so as to only deliver the information provided by a server to the user, such as through browser search results. The information may be drawn from a very limited data pool, amongst other deficiencies. Accordingly, a device that obtains and provides such information would be beneficial.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

According to a general aspect, an apparatus for notification of speech of interest to a user includes a voice analyzer configured to recognize speech, evaluate a relevance between a result of the speech recognition and a determined user's topic of interest, and determine whether to provide a notification; and an outputter configured to, in response to the voice analyzer determining to provide a notification, generate and output a notification message.

The apparatus may further include a topic-of-interest setter configured to determine a user's topic of interest.

The topic-of-interest setter may be further configured to determine the user's topic of interest based on a user input or automatically determine the user's topic of interest by analyzing user's contextual information.

The contextual information may include at least one of user's schedule stored in the apparatus or location data determined by the apparatus.

The topic-of-interest setter may be further configured to learn the determined user's topic of interest based on the evaluated relevance.

The voice analyzer may include a text generator configured to generate text in the recognizing of the speech and a text analyzer configured to evaluate a relevance between the generated text and the user's topic of interest.

The text analyzer may be configured to apply at least one of support vector machine (SVM) classification or neural network classification to classify the generated text, and evaluate a relevance between a classification result and the user's topic of interest in determining whether to provide the notification.

The text analyzer may be further configured to evaluate the relevance between the text and the user's topic of interest based on at least one of the following: presence or absence of a user's user keyword in the generated text, a number of user keywords in the text, or a number of words in the text relating to the user keyword, as respectively set by the topic-of-interest setter.

The outputter may be further configured to output the notification message in at least one of the following forms: text, a voice, a vibration, or an alerting sound.

The outputter may be further configured to determine importance of notification based on the speech recognition result and select between plural notification methods according to the importance to output the notification.

The apparatus may further include a voice translator configured to translate a language of the recognized speech into a language designated by the user for evaluation of the relevance in the designated language, or to translate the notification into the designated language after evaluation of the relevance in the language of the recognized speech.

According to another general aspect, a speech notification method includes actuating a processor portion to recognize speech, evaluating a relevance between a result of the speech recognition and a determined user's topic of interest, and determining whether to provide a notification based on the evaluation; and in response to the determination that the notification is provided to the user, generating and outputting, to the user, a notification message.

The method may further include determining a user's topic of interest.

The determining of the user's topic of interest may include determining the user's topic of interest based on a user input or automatically determining the user's topic of interest by analyzing user's contextual information.

The contextual information may include at least one of the user's schedule and location data.

The determining of the user's topic of interest may include, in response to the determination that the notification is provided, learning the determined user's topic of interest based on the evaluated relevance.

The determining of whether to provide a notification may include generating text of the recognized speech and evaluating a relevance between the generated text and the user's topic of interest.

The evaluating of the relevance may include applying at least one of support vector machine (SVM) classification or neural network classification to classify the generated text, and evaluating a relevance between a classification result and the user's topic of interest.

The evaluating of the relevance between the text and the user's topic of interest may be performed based on at least one of the following: presence or absence of the user's user keyword in the generated text, a number of user keywords in the text, or a number of words in the text relating to the user keyword.

The notification message may be outputted in at least one of the following forms: text, a voice, a vibration, and an alerting sound.

The producing of the notification message may further include determining an importance of notification based on the speech recognition result and determining a notification method according to the importance.

The method may further include translating a language of the recognized speech into a language designated by the user for evaluation of the relevance in the designated language, or to translating the notification into the designated language after evaluation of the relevance in the language of the recognized speech.

A non-transitory computer-readable medium may store instructions that, when executed by one or more processors, cause the one or more processors to perform the method.

According to another general aspect, a method for selective notification, to a user, of detected relevant speech, includes executing a processor to actuate a microphone; storing, in a memory, speech captured by the microphone; transforming the captured speech, via a voice recognizer, into text; and, selectively alerting a user, in response to a determined relation between the text and a pre-established user keyword.

The method may further include generating a network of related words based on the pre-established user keyword; and, determining a relation between the text and the network of related words.

The network may include a neural network.

The method may further include transforming one of the text or the user keyword from a first language into a second language for comparison to determine the relation between the text and the pre-established keyword.

Other features and aspects will be apparent from the following detailed description, the drawings, and the claims.

BRIEF DESCRIPTION OF THE DRAWINGS

FIG. 3 is a diagram illustrating an example of set user's topics of interest.

FIG. 7 is a flowchart illustrating a method providing voice notifications to a user regarding his or her set topic(s) of interest according to one or more embodiments.

FIG. 8 is a flowchart illustrating a method providing voice notifications to a user regarding his or her set topic(s) of interest, with support for language translations, according to one or more embodiments.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Hereinafter, embodiments of an apparatus for notification of speech of interest to a user will be described in detail with reference to the accompanying drawings.

The apparatus is or is equipped in various mobile terminals, for example, tablets, smart phones or wearable devices, such as smart watches and smart glasses.

Whether it is because a user is hearing impaired, unfamiliar with a particular language, elderly, cannot hear a specific sound due to ambient noise, cannot hear peripheral sounds due to the use of earphones/headset/virtual reality apparatus, or even in a situation in which the user has something in particular he/she wishes to hear, the apparatus 100 may be effectively applied to one or more of such various situations to provide selective, and transformative, notification of various stimuli detected and recognized in the real world.

Figure 1:
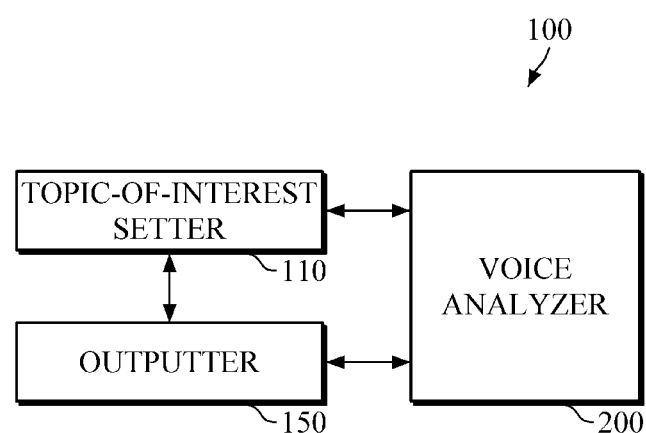
FIG. 1 is a block diagram, according to an embodiment, illustrating an apparatus providing voice notifications to a user regarding his or her topic of interest.

FIG. 1 is a block diagram, according to an embodiment, illustrating an apparatus providing voice (speech) notifications to a user regarding his or her topic of interest, whereby the apparatus 100 includes a topic-of-interest setter 110, a voice analyzer 200, and an outputter 150 (which may include an amplifier, filters, a loudspeaker, headphones, a vibration motor, Bluetooth signal transceiver and earpiece, and the like).

The topic-of-interest setter 110 determines those topics that a user is interested in and wants to receive notifications for. Such topics may include, for example, airports, subways, trains, ship, amusement parks, fire, evacuation, and first-aid, which can be set as categories, as well as keywords, such as flight number, departure time and arrival time of a train, the particular user's identification, or identification of physical objects with a nexus to the user, and the like.

According to one or more embodiments, the topic-of-interest setter 110 may determine the user's topics of interest based on user input. The topic-of-interest setter 110 may do so by storing, in advance, various topics that the user may be interested in, from which the user may select the ones that he or she desires. For example, the topic-of-interest setter 110 may receive information about a flight ticket that the user booked, then determines its category as "Airport," and automatically decides that the specific flight number, a departure time, gate number, and so on as the 'user's keywords of interest' (hereinafter referred to as 'user keywords').

The topic-of-interest setter 110, according to one or more embodiments, may automatically determine the user's topics of interest by analyzing the user's contextual information.

The contextual information may include, e.g. the schedule and location data of the user. For example, where the apparatus 100 is, or is equipped in a mobile terminal, the topic-of-interest setter 110 may obtain current contextual information by extracting user keywords from the user's schedule, address book, memos, text messages, emails, social media posts, calendars, or other personal sources the user chooses to provide or make available or which may automatically be available by default, for example previously searched keywords, as well as by extracting keywords related to the user's physical location based on the current location data of the mobile terminal. Also, the topic-of-interest setter 110 may refer, in one or more embodiments, to the user's schedule stored in a memory of the mobile terminal so as to determine the weather, time, and destination (location) as contextual information. In addition, the topic-of-interest setter 110 collects location data using a global positioning system (GPS) sensor, Wireless Ian (WiFi) readings compared with a matrix of WiFi access point (AP) signal strengths of a hardware communication device or transceiver, or other location sources, such as metadata, tags, or social media postings, in the mobile terminal, and identify the current location, for example, an airport, from the collected location data. Based on the obtained contextual information, the topic-of-interest setter 110 may automatically determine the category of the user's topic of interest as an airport and the user keywords as the date, time, destination, and the like, and in one or more embodiments, may go on even further to divide the airport topic into a parent category and one or more subcategories. For example, the topic-of-interest setter 110 may set the keywords that have been extracted based on the information input by the user as individual user keywords, or may cluster or aggregate the extracted keywords into parent categories and subcategories. Also, the topic-of-interest setter 110 may automatically extract, in one or more embodiments, multiple keywords related to the user keywords and determine the extracted keywords as the user keywords. For example, where the user's keyword is 'ship,' the multiple keywords may include boat, cruise, yacht, sail, and such other synonyms or related words in one or more languages.

If the voice analyzer 200 is configured such that it provides notifications, according to one or more embodiments, the topic-of-interest setter 110 may learn the user's topics of interest based on relevance information provided by the voice analyzer 200, such as through a training model, including a neural network model, as an example only. The user, according to one or more embodiments, may perform an interaction with the mobile terminal (such as by provision of a graphical user interface or an audio exchange) to set the linguistic unit of a user keyword as a morpheme, a word, a sentence, and the like, and also input proper nouns as keywords or keywords related to a context in which a recognized speech is involved. The topic-of-interest setter 110 may learn the relevance information provided from the voice analyzer 200, as well as the keywords input by the user, so as to determine the user's topics of interest. For example, the topic of interest setter 110 may include a model generation and/or updater that may generate a model with the relevant information and the keywords as training data.

The voice analyzer 200 may recognize speech from sound that is input to the apparatus 100 and evaluates the relevance between the recognition result and the user's topics of interest in order to determine whether to give the user a notification. The voice analyzer 200 may extract raw voice data from the input sound, and recognize the raw voice data using one or more speech recognition algorithms such as through acoustic and/or linguistic models stored in a memory of the apparatus. In this case, the voice analyzer 200 may utilize a voice activity detection (VAD) technique to initiate voice monitoring only when a voice with an intensity, amplitude, or volume level greater than a threshold is input. In addition, in a case where sounds are input from multiple sound sources, the voice analyzer 200 may identify the same sound source using frequency characteristics of the input sounds. The voice analyzer 200 may monitor announcements, and recognize speech from detected sounds at a public site (such as an airport, bus terminal, ferry, or the like), emergency announcements and notifications, alert notifications, or the like.

Figure 2:
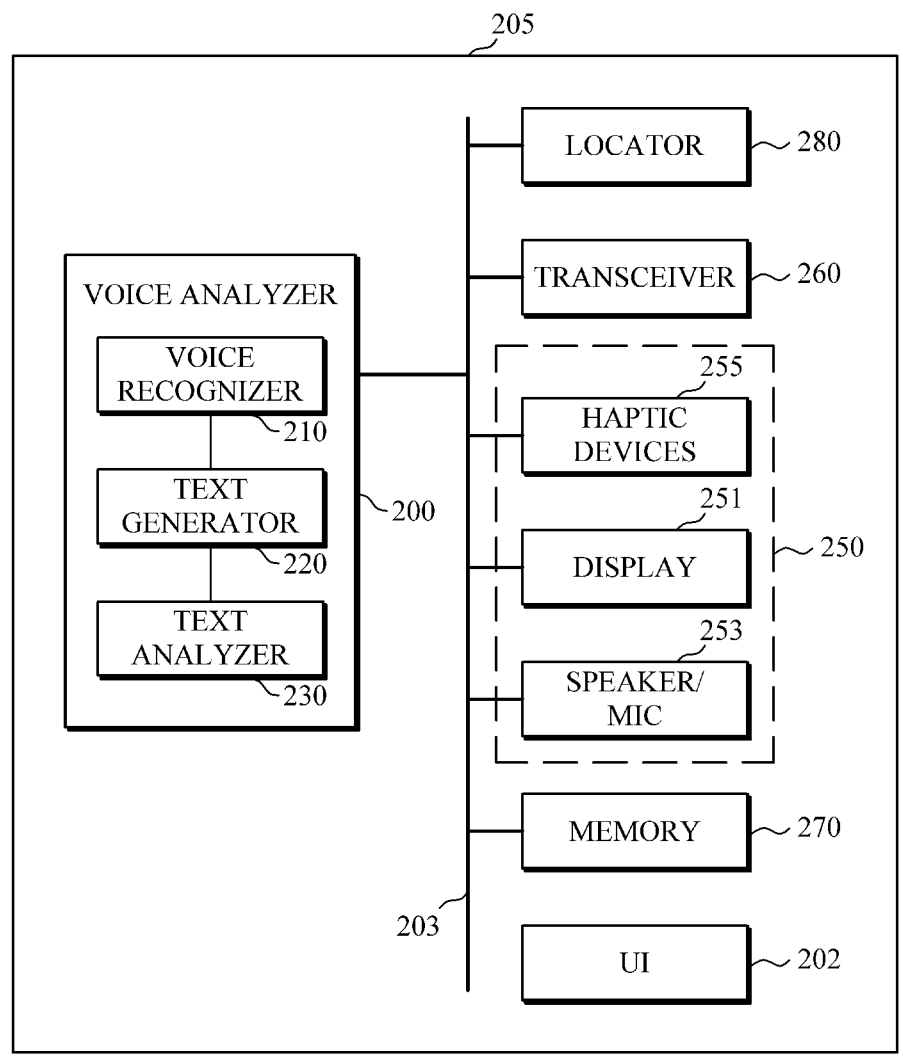
FIG. 2 illustrates a mobile terminal according to one or more embodiments.

The voice analyzer 200, according to one or more embodiments, includes a text generator and a text analyzer, as seen, for example, in FIG. 2. The text generator may recognize speech and convert the recognition result into text, such as through the aforementioned acoustic or linguistic models, or other algorithms, for example, the voice analyzer 200 may extract the raw voice data as audio frame data, and input audio frame data to the acoustic or linguistic models. The text analyzer may compare the generated text with the user's topics of interest to evaluate the relevance. The voice analyzer 200 may apply one or more of support vector machine (SVM) classification, neural network classification, or other classification, as would be known to one of skill in the art after gaining a thorough understanding of the entirety of the description provided herein, to classify the generated text, and then evaluate the relevance between the classification result and the user's topics of interest. In the case of using the neural network classification, for example, the voice analyzer 200 may extract keywords from the recognized result, identify a context in which the speech is involved, and classify the recognized speech into a specific category.

In addition, the voice analyzer 200, in one or more embodiments, may evaluate the relevance between the recognized speech and the user's topics of interest based on the classification result of the recognized speech, the presence or absence of a user keyword in the generated text, the number of user keywords in the text, or the number of words in the text relating to the user keywords.

The voice analyzer 200, for example, may determine whether to provide a notification to the user based on the determined relevance between the speech recognition result and the determined user's topic of interest. For example, if the speech recognition result is determined to be relevant to the user's topic of interest or if the text of the recognized speech is determined to be relevant to the user's topics of interest, the voice recognizer 200 may automatically decide to provide a notification to the user. Further details of the voice analyzer 200 will be described later with reference to FIG. 2.

When the voice analyzer 200 decides to provide a notification, the outputter 150 may generate and output a notification message. The outputter 150 may provide a notification message in a variety of forms. The outputter 150 may provide a notification message in at least one of the following forms: displayed text, an auditory voice, vibratory/haptic, visual, and/or a sound alert (through one or more audio channels, such as a loudspeaker, headphone outlet, bone conduction speaker, or via a Bluetooth headset). For example, the outputter 150 may output at least one text of the recognized speech, such as a synthesized voice that is produced through text to speech (TTS) on said text, and a sound alert, or may output the combination of the text and the sound. Also, the outputter 150 may determine the importance of the notification based on the recognized speech, and determine or select the notification method according to importance. For example, in the case where the category of the recognized speech is "Security," the outputter may determine that the speech needs to be urgently notified to the user, e.g., the apparatus 100 may place a higher importance on the category, 'Security,' so an auditory alert may be selected for the notification.

The outputter 150 may determine the method of notification according to priority or importance. For example, the outputter 150 may produce the notification message with a sound/vibration alert, repeatedly produce said notification message, adjust the volume of said notification message or emphasize the text of said notification message. Hence, the method and form of the notification message may vary according to one or more embodiments.

Whether it is because a user is hearing impaired, elderly, cannot hear a specific sound due to ambient noise, cannot hear peripheral sounds due to the use of earphones/headset, or even in a situation in which the user has something in particular he/she wishes to hear, the apparatus 100 may be effectively applied to such various situations.

Figure 4:
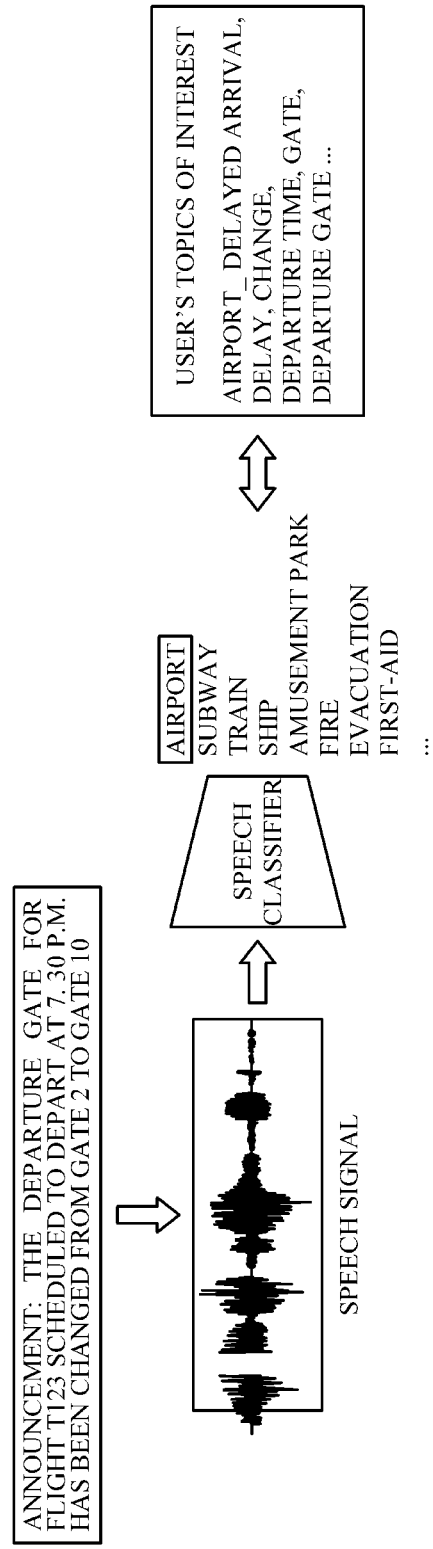
FIG. 4 is a diagram illustrating an example of speech recognition analysis.
Figure 5:
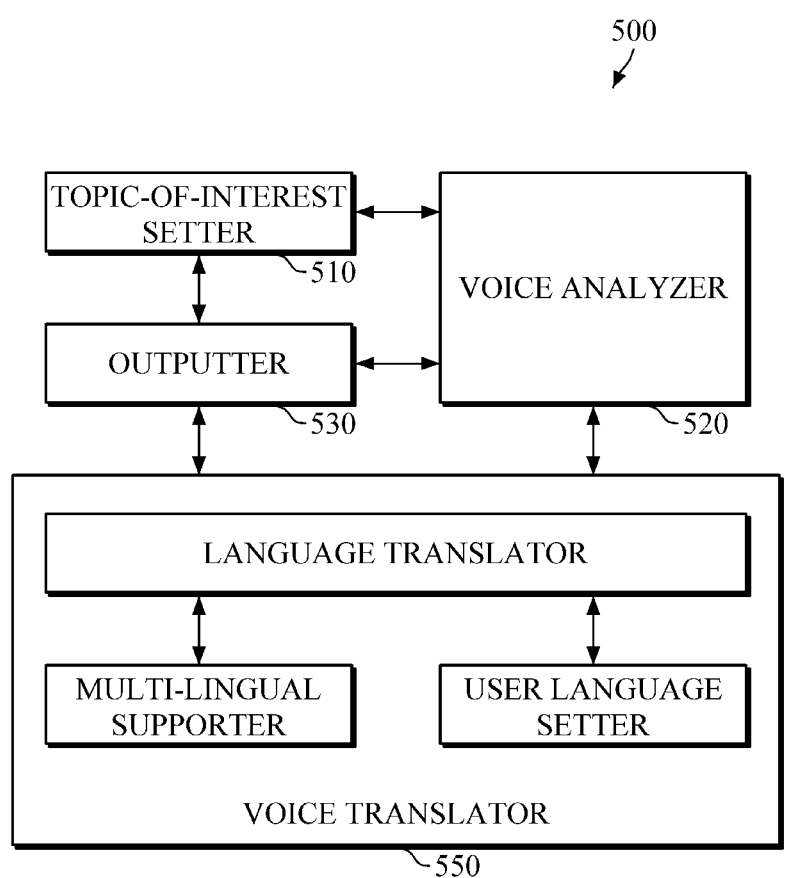
FIG. 5 is a diagram illustrating an apparatus, according to one or more embodiments, providing voice notifications to a user regarding his or her topic of interest.

The apparatuses, modules, devices, such as the topic of interest setter 110, outputter 150, voice analyzer 200, voice recognizer 210, text generator 220, text analyzer 230, and voice translator 550, and other components illustrated in FIGS. 1, 2, and 5 that perform the operations described herein with respect to FIGS. 3, 4, and 6-8 are implemented by hardware components. Examples of hardware components include controllers, sensors, generators, drivers, memories, comparators, arithmetic logic units, adders, subtractors, multipliers, dividers, integrators, processor portions, and any other electronic components known to one of ordinary skill in the art. In one example, the hardware components are implemented by computing hardware, for example, by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 3-4 and 6-8. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing. FIG. 2 illustrates a mobile terminal 205 according to one or more embodiments.

Referring to FIG. 2, the mobile terminal 205 may include a voice analyzer 200, such as the voice analyzer 200 of FIG. 1, and may include a voice recognizer 210, a text generator 220, and a text analyzer 230, for example. The mobile terminal 205 may correspond to the apparatus 100 of FIG. 1, though embodiments are not limited thereto. The mobile terminal 205 may further include a communication bus 203, a user interface (UI) 202, a transceiver 260, a memory 270, a locator 280, and an outputter 250. The outputter 250 may include a display 251, a speaker 253, and haptic device(s) 255. The user interface 202 may represent any or any combination of a microphone, keyboard, touchscreen, touchpad, and camera, depending on embodiment. In addition, depending on embodiment user interface may further represent a gaze detector or motion input detector, for input by the user. In addition, the memory 270 may store language models for use in the speech recognition, such as by the voice recognizer 210, and other personalization databases (DBs), for example, for use in the determination and storing of the topics of interest, categories, keywords, etc. The memory 270 may further be configured to store instructions, where one or more processors or computing devices represented by the voice analyzer 200, the topic-of-interest setter 110, or of the mobile terminal 205, as only example, are further configured to execute the instructions to configure the one or more processors or computing devices to perform any or any combination of the operations or methods described herein. In addition, the outputter 250 may further correspond to the outputter 150 of FIG. 1, the mobile terminal 205 may further include a topic-of-interest setter, such as the topic-of-interest setter 110, of FIG. 1, though embodiments are not limited thereto.

The voice recognizer 210, according to one or more embodiments, monitors various sounds produced around one or more microphones of the user interface 202 and extracts raw voice data from the sound. At this time, the voice recognizer 210 may utilize voice activity detection (VAD) to initiate voice monitoring, in response to a sound or voice with a volume level greater than a certain predetermined threshold is input. The threshold may be adaptively applied, or set, relative to a monitored ambient noise of the environment.

In addition, in the case where various sounds are input from multiple sound sources, the voice recognizer 210 may identify the same sound source using the determined frequency characteristics of the input sounds. For example, in a noisy airport, the voice recognizer 210 may detect the airport announcement that is a voice of relatively higher amplitude at a constant frequency, and may in turn recognize the speech from the announcement to the exclusion of ambient noises and speech.

The text generator 220, according to one or more embodiments, recognizes speech from the raw voice data extracted by the voice recognizer 210, and generates text from the recognition result.

The text analyzer 230 evaluates the relevance between the generated text and the user's topic(s) of interest. According to the embodiment, the text analyzer 230 may apply either one or both SVM classification and neural network classification to classify the text of the recognized speech, and evaluate the relevance between the classification result of the recognized speech and the user's topic of interest.

According to one or more embodiments, the text analyzer 230 may use SVM classification to classify the generated text into categories by constructing a SVM architecture that defines kernel functions.

As another example, the text analyzer 230 may classify the generated text into categories and keywords through the neural network classification, which is a statistical learning algorithm. In this case, the neural network may be defined by the interconnection pattern between different layers of neurons, a learning process for updating the weights of the interconnections, and the activation function that converts a neuron's weighted input to its output activation.

By using the neural network classification, the text analyzer 230 is able to identify the context which is referred to by the generated text, and may categorize the text corresponding to the identified context. For example, the text analyzer 230 may classify keywords into parent categories and subcategories through text clustering technology. Also, the text analyzer 230 may evaluate the relevance between the classification result of the text and the determined user's topic of interest based on related keywords of each category. The neural network classification is adaptive, and hence is suitable for classifying speech recognition that is otherwise difficult to be dealt with by rule-based programming.

To further elaborate, the text analyzer 230 may divide the generated text into designated linguistic units, such as, morphemes, words, and sentences; identify the context from the generated text; and classify important keywords into categories based on meanings of the respective linguistic units of the text and the statistical probability distribution of frequently used connections. In addition, the text analyzer 230 may determine parent categories and subcategories of the recognized speech by taking into consideration the context of the text and clustering the recognized keywords and the related keywords.

The text analyzer 230 may evaluate the relevance between the generated text and the user's topic of interest, based on at least one of the following factors: the classification result of the text generated from the recognized speech, the presence or absence of the user keywords in the generated text, the number of user keywords in the text, and the number of words in the text relating to the user keywords.

In this case, the text analyzer 230 may reduce chances of any false alarms or inaccurate recognitions by taking into account the number of keywords in the generated text of the recognized speech, and evaluate the relevance between the keywords in the text and the keywords contained in the user's topic of interest. The text analyzer 230 may decide to provide a notification to the user, but only when the analysis result of the generated text shows that the relevance to the user's topics of interest is greater than a threshold.

The transceiver 260 may use any one communication method among LAN, Wi-Fi, Bluetooth, Infrared Data Association (IrDA), HomeRF, Near-Field Communication (NFC), Ultra Wide Band (UWB), ZigBee, Global System for Mobile Communications, Code Division multiple Access (CDMA), Long Term Evolution (LTE), and Wireless Broadband (WiBro), for transmission and/or reception of data. The transceiver 260 may include an antenna for transmitting and receiving communication data as describe in the methods discussed herein. However, the communication method used by the transceiver 260 is not limited thereto, and the transceiver 260 may also use other communication methods for communication between devices.

In addition to the above embodiments, the classification of the recognized speech and the evaluation of the relevance between the text and the user's topics of interest may vary.

FIG. 3 is a diagram illustrating an example of a user's topics of interest set by the apparatus of FIG. 1 or the mobile terminal of FIG. 2, as only non-limiting examples. Thus, though descriptors below will be set forth with reference to the apparatus of FIG. 1, embodiments are not limited thereto, and such descriptors should be considered applicable to the mobile terminal of FIG. 2 as well, or other implementations. The topic-of-interest setter 110 may determine the user's topics of interest based on the user's input, or may automatically determine the user's topics of interest through analysis on said user's contextual information. The user's topics of interest may be determined with respect to various contexts, and may include morphemes, words, and sentences, which are the smallest meaningful linguistic unit in each category.

Referring to FIG. 3, the topic-of-interest setter 110 may set parent categories of, for example, "Location," "Security," "Event," and "Learning." According to one or more embodiments, category 1 may be set as "Location" and its subcategories may be set as "Airport," "Bus," "Subway," "Train," "Ship," "Amusement park," etc.

For example, the mobile terminal may obtain location data from either a GPS or the accessed mobile station, and may achieve location contextual information from the user's current location. The topic-of-interest setter 110 may obtain the location contextual information from the current location data of the mobile terminal equipped with the apparatus 100, and extract categories related to the location and user keywords from the contextual information and decide that the extracted data may be set as the user's topic of interest.

According to an embodiment, the topic-of-interest setter 110 may set category 2 as "Security," and set its subcategories as "Emergency," "Evacuation," "Escape," "911," "Fire," "Help me," and so on. For example, the topic-of-interest setter 110 may store, in advance, keywords related to the security issues so as to provide a notification to the user when an emergency or urgent situation arises. By doing so, the apparatus 100 can provide a notification message to the user while monitoring the voices around the apparatus 100 even when the user cannot directly hear the voice related to the security issues from a sound source, thus enabling the user to be notified of the emergency or urgent situation.

According to an embodiment, the topic-of-interest setter 110 may set category 3 as "Event," and correlate each subcategory and user keywords as one set; said set is then designated as the user's topic of interest. For example, the user keywords, such as, a delayed arrival, delays, changes, etc. are correlated with subcategory "Airport." Also, subcategory "Evacuation" may be correlated with user keywords, such as disaster, hurricane, fire, earthquake, and the like. Similarly, category "Escape" may be correlated with user keywords, such as, a hallway, an emergency staircase, an emergency exit, and the like.

In addition, the topic-of-interest setter 110 may set not only user keywords but also commonly used vocabulary as categories. For instance, the sentence "Fire!" can be categorized and may be correlated with user keywords, such as "fire", "fire station", "evacuation", and so on.

The topic-of-interest setter 110 may add a category or a user keyword based on the user input it receives or may add more categories or user keywords based on the contextual information it obtains. Furthermore, though a keyword may already exist in one category, if multiple detailed keywords are added, the topic-of-interest setter 110 will classify them as being part of new subcategories and thus decide that said keywords are the user's topics of interest.

According to an embodiment, the topic-of-interest setter 110 may learn the user's topics of interest based on analysis result of the test speech obtained by the voice analyzer 200. For example, the apparatus 100 may recognize the test speech "The departure gate for flight AA123 scheduled to depart at 10 a.m. has been changed to Gate 4" and determine the recognized speech so as to classify it into a specific category and user keywords. Thus, in this case, the topic-of-interest setter 110 may determine a category of the speech as "Airport" and determine "departure gate," "for," "flight," "AA123," "departing," "has been," "changed," "to," "Gate," "4," and so on as the user keywords. While the linguistic unit of a user keyword may be a morpheme, a word, or a sentence, such aspects of the description will not be construed as being limited to the examples set forth herein.

Also, the user may also input keywords that are replaceable (e.g., name of a destination, context, situation), to which the recognized speech is applied. For example, the apparatus 100 may be useful for a bus passenger who needs to pay attention to the bus stop announcements for his/her destination. When the apparatus 100 has recognized speech "The next stop is Gold Coast Station," the user may input "bus" as the context to which the speech recognition is applied, and "Gold Coast Station" as a keyword. In this case, the topic-of-interest setter may determine the user's topic of interest which has its category as "Bus" and the sentence "The next stop is Gold Coast Station" and the word "Gold Coast Station" as user keywords. In such manner, the user, though they may be asleep, engrossed in music, unfamiliar with the particular spoken language, or otherwise inattentive, may be selectively notified with particularity to ensure that they are aware of the stimuli—to the exclusion of other unimportant stimuli.

FIG. 4 is a diagram illustrating an example of speech recognition analysis.

Referring back to FIGS. 1 and 2, for examples, the voice recognizer 210 may monitor every surrounding sound and extract a speech signal of the announcement as raw voice data. For example, the voice recognizer 210 may monitor the surrounding sound and extract speech signal of "The departure gate for flight T123 scheduled to depart at 7:30 p.m. has been changed from Gate 2 to Gate 10" as the raw voice data from the airport announcement.

The text analyzer 230 may classify the generated text using a speech classifier, and determine the category to which the recognized speech can entirely belong based on the classification result. Examples of the category may include "Airport," "Subway," "Train," "Ship," "Amusement park," "Fire," "Evacuation," "First-aid," and the like.

In the above example, the text analyzer 230 may divide the text generated from the recognized speech into individual linguistic units, for example: "The/ departure gate/ for/ flight T123/ scheduled/ to/ depart/ at/ 7:30 p.m./ has been/ changed/ from/ Gate/ No. 2/ to/ Gate/ No. 10" (where slashes "/" indicate linguistic unit divisions). The linguistic unit of division may be a morpheme, a word, a sentence, or the like. However, the linguistic unit is not one that is fixed, and hence the linguistic unit mentioned above may be flexibly applied. Hereinafter, the individual linguistic units are collectively referred to as "keywords."

The text analyzer 230 may use a speech classifier to determine "Airport" category that encompasses keywords, "scheduled," "depart," "Flight T123," "departure gate," and "gate," by clustering related keywords. Through an analysis of airline confirmation, via email, banking or credit card records, out-of-office assistant, travel notices to financial institutions, or other information the user may choose to make available, text analyzer 230 may have certain pre-established information regarding keywords of interest, such as "Gold Coast," "Flight T123," or the like.

In addition, the text analyzer 230 may evaluate the relevance between the generated text of the recognized speech and the designated topic of interest by comparing the category of the classified speech, the related keywords, and the category and user keywords of the user's topic of interest. For example, according to one or more embodiments, such as shown in FIG. 4, the category of the recognized speech and the category of the user's topic of interest are both "airport" and the keywords obtained by text classification (i.e., "scheduled," "depart," "Flight T123," "departure gate," "gate," and "changed,") match the user keywords of the user's topic of interest (i.e., "change," "gate," and "departure gate,"); the text analyzer 230 may thus determine that the recognized speech is relevant to the designated topic of interest. When recognizing the relevance between the recognized speech and the designated topic of interest, the text analyzer 230 may decide to provide a notification to the user.

FIG. 5 is a diagram illustrating an apparatus, according to one or more embodiments, providing voice notifications to a user regarding his or her topic of interest. The apparatus 500 may include a topic-of-interest setter 510, a voice analyzer 520, an outputter 530, and a voice translator 550 though embodiments are not limited thereto, the apparatus 500, e.g. including the topic-of-interest setter 510, the voice analyzer 520, and the outputter 530 of the apparatus 500 may correspond to the apparatus 100 and mobile terminal 205 of FIGS. 1 and 2, and thus detailed descriptions thereof will not be reiterated here, for clarity and conciseness.

The voice translator 550 may include a user language setter to set a user's designated language, a multi-lingual supporter and a language translator. Here, the voice translator 550 may be provided in or out of, or remotely from, the apparatus 500, and may comprise instructions on a non-transitory media to be executable by hardware and/or hardware to support multi-lingual voice features.

The voice translator 550 may translate language of the recognized speech into the user's designated language. The user may, for example, designate English as the user language in the apparatus 500 and the user may be in a foreign airport where the airport announcements are provided in another language. In this case, the apparatus 500 may use the multi-lingual supporter, since it supports a multi-lingual system, so as to provide an English voice which corresponds to the speech recognized from the surrounding sound or corresponds to the designated user's topic of interest. The memory of the apparatus 500 may store databases or other translation vocabularies for such multi-lingual support.

For example, when an announcement is made in Chinese, "告知东邦航空。扇定 7:30 起飞门 123 友好已更改为 10门 2" and the recognized language (Chinese) does not match the user's designated language (English), the voice translator 550 automatically translates the recognized speech from Chinese to English, "This is an announcement from China East Airlines. The departure gate for flight T123, scheduled to depart at 7:30, has been changed from Gate 2 to Gate 10."

Generally, foreign passengers may experience language-related communication difficulties in an overseas airport, especially when trying to understand airport announcements that provide important information, such as flight delays, change of gate, and change in departure time. Even in such cases, the apparatus 500, according to one or more embodiments, may give automated real-time voice notifications to the user by using the voice translator 550 to translate any foreign languages.

Figure 6:
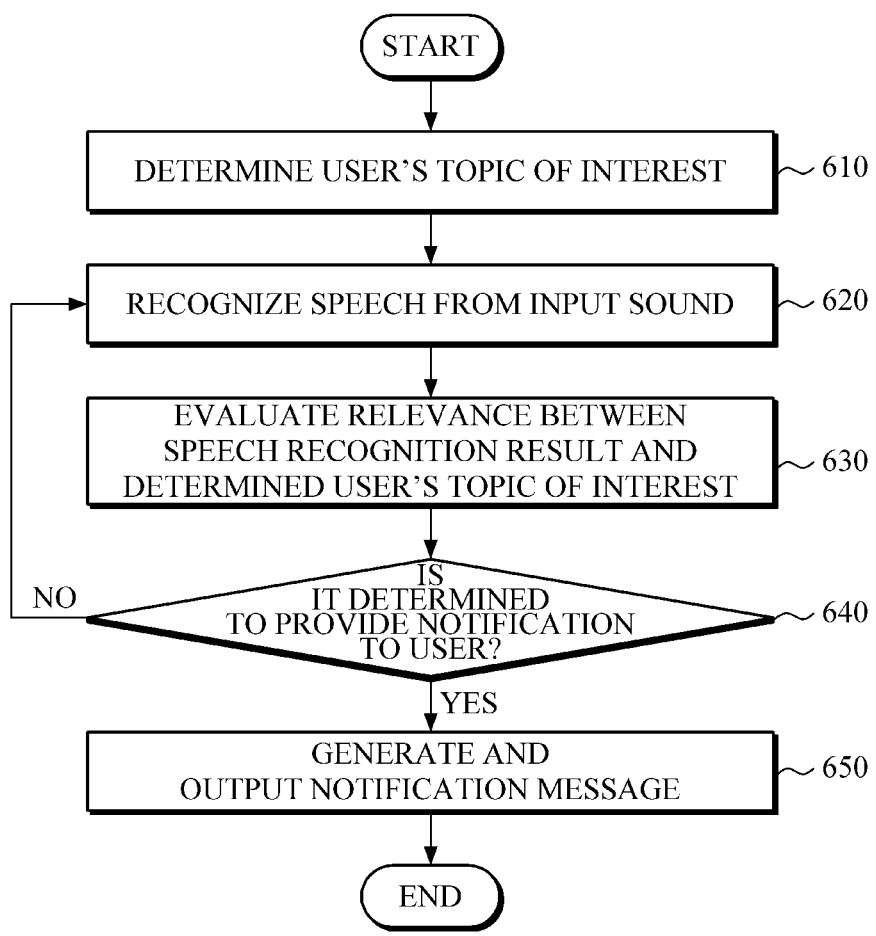
FIG. 6 is a flowchart illustrating a method, according to an embodiment, providing voice notifications to a user regarding his or her topic of interest using according to one or more embodiments.

FIG. 6 is a flowchart illustrating a method, according to one or more embodiments, for providing voice notifications to a user regarding his or her topic of interest using any one of the apparatuses of FIGS. 1-2 and 5, though embodiments are not limiting thereof. Accordingly, though below explanations of the operations of FIG. 6 will be set forth with reference to the apparatus 100 of FIG. 1, embodiments are not limited thereto, and such explanation is also applicable to the apparatuses of FIGS. 2 and 5, as well as other non-limiting apparatuses.

In 610, the apparatus 100 may determine the user's topic of interest. The user's topic of interest may include a category, such as "Airport," "Subway," "Train," "Ship," "Amusement park," "Fire," "Evacuation," and "First-Aid," as well as user keywords, such as "flight number," "departure time" "arrival time of a train," and the like.

For example, the apparatus 100 may determine the user's topic of interest based on the user input. For example, the apparatus 100 may store in a memory of the apparatus 100 in advance, various topics that the user may be interested in. When the user selects a certain one from the various topics, the apparatus 100 may set it as being the user's topic of interest.

According to another example, the apparatus 100 may automatically determine the user's topic of interest through analysis of user's contextual information. For example, the apparatus 100 may analyze the user's contextual information based on contextual information, or harvested accounts, it has obtained and information input by the user, and then determine the user's topic of interest. Here, the contextual information may include user's schedule and location data. For example, if the apparatus 100 is a mobile terminal or is equipped in a mobile terminal, the apparatus 100 may extract user keywords from the schedule, memos, text, email, social media, and used search keywords of the user. In addition, the apparatus 100 may extract from the current location data of the mobile terminal keywords related to a physical location of the user, and thereby obtain current contextual information.

The apparatus 100 may refer to the user's schedule stored in the mobile terminal to obtain the date, time, and destination (location) as contextual information. In addition, the apparatus 100 may collect location data through a GPS sensor, WiFi, and mobile transceivers, and identify a current location of the mobile terminal, for example, in an airport, based on the collected location data. As such, the apparatus 100 may set "Airport" as the category of the user's topic of interest, and the "date", "time", and "destination" as user keywords.

In this case, the user's topics of interest may be subdivided into parent categories and subcategories. For example, the apparatus 100 may determine keywords extracted based on the obtained contextual information and information input by the user as the user keywords, or cluster the extracted keywords to determine parent categories and subcategories. In addition, the apparatus 100 may automatically extract multiple keywords related to the user keywords, and set the extracted keywords as user keywords.

According to another example, when the apparatus 100 decides to provide a notification, it may learn the user's topic of interest based on relevance information. In this case, the user may set the linguistic unit of a user keyword as a morpheme, a word, a sentence, or the like, and may also input proper nouns as keywords or keywords related to a context in which a recognized speech is involved. The apparatus 100 may determine the user's topic of interest by learning the relevance information and keywords input by the user.

Then, in 620, the apparatus may recognize speech from input sound. The apparatus 100 may extract raw voice data from the surrounding sound, and recognize speech from the extracted raw voice data using a speech recognition algorithm. In this case, the apparatus 100 may utilize VAD to initiate voice monitoring only when a voice with a level greater than a threshold is input. In the case where sounds are input from multiple sound sources, the apparatus 100 may identify the same sound source using their frequency characteristics.

The apparatus 100 may monitor announcements in a public site, emergency announcements and notifications, alert notifications or the like, and recognize speech therefrom.

In 630, the apparatus 100 may evaluate the relevance between the speech recognition result and what has been determined to be a user's topic of interest. According to the example, the apparatus 100 may generate text of the recognized speech, and evaluate the relevance between the generated text and the determined user's topic of interest. In this case, the apparatus 100 may apply SVM classification or neural network classification to classify the generated text, and evaluate the relevance between the classification result and the determined user's topic of interest. In the case of applying the neural network classification, the apparatus 100 may extract keywords from the generated text, identify the context which is referred to by the text, and classify the text into a category corresponding to the identified context.

The apparatus 100 may evaluate the relevance between the generated text and the user's topic of interest based on the classification result of the recognized speech, the presence or absence of a user keyword in the generated text, the number of user keywords in the text, and the number of words in the text relating to the user keywords.

The apparatus 100 may decide to provide a notification according to the relevance between the speech recognition result and the determined topic of interest, as depicted in 640. For example, if the speech recognition result is relevant to the user's topic of interest, or if the text of the recognized speech is relevant to the user's topic of interest, the voice recognizer 200 may decide to provide a notification to the user, as depicted in 640. If the relevance between the speech recognition result and the determined topic of interest is lower than a threshold, speech recognition from the input sound, as depicted in 620, is performed.

Then, when the apparatus 100 decides to provide a notification, the apparatus 100 may output a notification message, as depicted in 650. At this time, the apparatus 100 may provide a notification message in various forms of which at least one of the following is used: text, a voice, a sound alert. For example, the apparatus 100 may provide the notification message by producing at least a text of the recognized speech, a synthesized voice that is produced through TTS on said text, a sound alert, haptic alert, or producing the combination of both the text and the sound.

Also, the apparatus 100 may determine the importance of the notification based on the recognized speech, and determine the notification method according to importance. For example, in the case where the category of the recognized speech is "Security" and thus the speech needs to be urgently notified to the user, the apparatus 100 may place a higher importance on "Security" category.

The apparatus 100 may determine the notification method according to the importance of notification. For example, the apparatus 100 may produce the notification message with a sound/vibration alert, repeatedly produce said notification message, adjust the volume of said notification message or produce emphasized text of said notification message. Hence, the method and form of the notification message may vary, and aspects of the description are not limited to the above description.

In addition to the "Security" category, the apparatus may also determine the importance of other categories.

FIG. 7 is a flowchart illustrating a method of providing voice notifications to a user regarding his or her topic of interest according to an embodiment. Though below explanation of the operations of FIG. 7 will be set forth with reference to the apparatus 100 of FIG. 1, embodiments are not limited thereto, and such explanation is also applicable to the apparatuses of FIGS. 2 and 5, as well as other non-limiting apparatuses.

In 710, the apparatus 100 determines a user's topic of interest.

In 720, the apparatus monitors input sound. The apparatus 100 may monitor sound input through one or more microphones and extract raw voice data. In this case, the apparatus 100 may utilize VAD to initiate voice monitoring only when a voice with a level greater than a threshold is input.

In the case where sounds are input from multiple sound sources, the apparatus 100 may identify the same sound source using frequency characteristics of the input sounds. For example, in a noisy airport, the apparatus 100 may extract an airport announcement consisting of a voice of relatively higher amplitude at a constant frequency, and then in turn, detect speech therefrom.

Then, in 730, the apparatus determines if speech recognition is possible from the extracted raw voice data. Even when various surrounding noises are input, if the apparatus has failed to recognize speech, the apparatus 100 performs monitoring of the input sound, as depicted in 720.

The speech recognition may be performed using various known technologies. When speech is recognized, as depicted in 730, the apparatus 100 may generate text of the recognized speech, as depicted in 740.

Then, the apparatus may evaluate the relevance between the generated text and the determined user's topic of interest, as depicted in 750. The apparatus may apply either or both the SVM classification or the neural network classification so as to classify the text of the recognized speech, and may evaluate the relevance between the classification result of the text and the user's topic of interest.

According to one or more embodiments, the apparatus 100 may use SVM classification, for example, to classify the generated text into categories by constructing an SVM architecture that defines kernel functions.

According to another example, the apparatus 100 may classify the generated text into categories and keywords through the neural network classification, which is a statistical learning algorithm. In this case, the neural network may be defined by the interconnection pattern between different layers of neurons, a learning process for updating the weights of the interconnections, and the activation function that converts a neuron's weighted input to its output activation.

By using the neural network classification, the apparatus 100 may identify the context which is referred to by the recognized speech, and may categorize the text corresponding to the identified context. For example, the apparatus 100 may classify keywords into parent categories and subcategories through text clustering technology. Also, the apparatus 100 may evaluate the relevance between the classification result of the text and the determined user's topic of interest based on related keywords of each category. The neural network classification is adaptive, and hence is suitable for classifying speech recognition that is otherwise difficult to be dealt with by rule-based programming The apparatus 100 may divide the generated text into designated linguistic units, such as, morphemes, words, and sentences, and classify the context of the recognized speech and important keywords into categories based on meanings of the respective linguistic units of text and the statistical probability distribution of frequently used connections. In addition, the apparatus 100 may determine parent categories and subcategories of the recognized speech by taking into consideration the context of the text and clustering the recognized keywords and the related keywords.

The apparatus 100 may evaluate the relevance between the generated text and the user's topic of interest based on at least one of (or on a combination of) the following: the classification result of the recognized speech, the presence or absence of a user keyword in the generated text, the number of user keywords in the text, and the number of words in the text relating to the user keywords.

In 760, the apparatus 100 decides or determines whether to provide a notification to the user. If the relevance between the generated text of the recognized speech and the user's topic of interest is greater than the threshold, the apparatus 100 may decide to provide a notification to the user, as depicted in 760. At this time, the apparatus 100 may reduce the chances of any false alarms by taking into account the number of keywords included in the generated text of the recognized speech. If said relevance is lower than the threshold, the apparatus 100 may perform monitoring of input sound, as depicted in 720.

Then, in 770, the apparatus 100 may provide a notification message in at least one of the following forms: text, voice, and sound alert. When the apparatus 100 decides to provide a notification to the user, the form of notification may vary. For example, the apparatus 100 may provide a notification message by producing at least one of or a combination of the following: the text of the recognized speech, a synthesized voice that is produced through TTS on said text, and a sound alert.

However, in addition to the above examples, there may be other notification methods and forms for providing the notification message.

FIG. 8 is a flowchart illustrating a method provides voice notifications to a user regarding his or her topic of interest with support for language translations, according to one or more embodiments. Though an explanation of the operations of FIG. 8 will be set forth with reference to the apparatus 500 of FIG. 5, embodiments are not limited thereto, and such explanation is also applicable to the apparatuses of FIGS. 1 and 2, as well as other non-limiting apparatuses.

In 810, the apparatus 500 determines user's topic of interest. Then, in 820, the apparatus 500 monitors input sound. In 830, the apparatus 500 extracts raw voice data and recognizes speech from the raw voice data.

Then, in 840, the apparatus 500 determines whether or not the language of the recognized speech differs from the language designated by the user. If the recognized language is the same as the designated language, the apparatus 500 generates text of the recognized speech without translation process, as depicted in 860.

If the recognized language is different from the designated language, the apparatus 500 translates the recognized speech into the user's designated language, as depicted in 850. Then, the apparatus 500 evaluates the relevance between the generated text and the user's topic of interest, as depicted in 870.

The consequent processes of determining whether to provide a notification to the user and generating and producing a notification message according to the determination are similar to those of flowcharts of FIGS. 6 and 7 and thus are not repeated here for convenience of explanation.

The topic-of-interest setter 110, outputter 150/250, voice analyzer 200, locator 280, voice recognizer 210, text generator 220, text analyzer 230, voice translator 550 including language translator, user language setter, and multi-lingual supporter in FIGS. 1, 2, and 5 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 4 and 6-8 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

As a non-exhaustive example only, a terminal/device/apparatus as described herein may be a mobile device, such as a cellular phone, a smart phone, a wearable smart device (such as a ring, a watch, a pair of glasses, a bracelet, an ankle bracelet, a belt, a necklace, an earring, a headband, a helmet, or a device embedded in clothing), a portable personal computer (PC) (such as a laptop, a notebook, a subnotebook, a netbook, or an ultra-mobile PC (UMPC), a tablet PC (tablet), a phablet, a personal digital assistant (PDA), a digital camera, a portable game console, an MP3 player, a portable/personal multimedia player (PMP), a handheld e-book, a global positioning system (GPS) navigation device, or a sensor, or a stationary device, such as a desktop PC, a high-definition television (HDTV), a DVD player, a Blu-ray player, a set-top box, or a home appliance, or any other mobile or stationary device capable of wireless or network communication. In one example, a wearable device is a device that is designed to be mountable directly on the body of the user, such as a pair of glasses or a bracelet. In another example, a wearable device is any device that is mounted on the body of the user using an attaching device, such as a smart phone or a tablet attached to the arm of a user using an armband, or hung around the neck of the user using a lanyard.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A speech notification apparatus, the apparatus comprising:
    one or more processors configured to:
    recognize speech;
    classify the recognized speech into a speech category;
    evaluate a relevance between the recognized speech and a topic of interest of a user of the apparatus;
    determine whether to provide a notification based on the relevance;
    determine a priority level of the speech category;
    in response to the determining to provide the notification, select a notification method based on the determined priority level of the speech category; and
    generate and output a notification message based on the selected notification method,
    wherein the one or more processors are further configured to determine the topic of interest by analyzing contextual information of the user, classify the contextual information into an interest category and an interest subcategory, classify the recognized speech into the speech category and a speech subcategory, and evaluate the relevance between the recognized speech and the topic of interest by comparing the interest category and the speech category.

2. The apparatus of claim 1, wherein the one or more processors are further configured to determine the topic of interest.

3. The apparatus of claim 1, wherein the contextual information comprises either one or both of a schedule of the user stored in the apparatus or location data determined by the apparatus.

4. The apparatus of claim 2, wherein, the one or more processors are further configured to learn the topic of interest based on the relevance.

5. The apparatus of claim 1, wherein the one or more processors are further configured to:
    convert the recognized speech to text; and
    evaluate the relevance between the generated text and the topic of interest.

6. The apparatus of claim 5, wherein the one or more processors are further configured to apply either one or both of support vector machine (SVM) classification or neural network classification to classify the text, and to evaluate the relevance between a classification result and the topic of interest in determining whether to provide the notification.

7. The apparatus of claim 5, wherein the one or more processors are further configured to evaluate the relevance between the text and the topic of interest based on any one or any combination of any two or more of presence or absence of a user keyword in the text, a number of user keywords in the text, or a number of words in the text relating to the user keyword, as respectively set by the one or more processors.

8. The apparatus of claim 1, wherein the one or more processors are further configured to output the notification message in any one or any combination of any two or more of the following forms: text, a voice, a vibration, or an alerting sound.

9. The apparatus of claim 1, wherein the one or more processors are further configured to translate a language of the recognized speech into a language designated by the user for evaluation of the relevance in the designated language, or to translate the notification into the designated language after evaluation of the relevance in the language of the recognized speech.

10. A speech notification method, comprising:
    actuating a processor to recognize speech;
    classifying the recognized speech into a speech category;
    evaluating a relevance between the recognized speech and a topic of interest of a user;
    determining whether to provide a notification based on the relevance;
    determining a priority level of the speech category;
    in response to determining to provide the notification to the user, selecting a notification method based on the determined priority level of the speech category; and
    generating and outputting, to the user, a notification message based on the selected notification method,
    wherein the method further comprises determining the topic of interest by analyzing contextual information of the user, classifying the contextual information into an interest category and an interest subcategory, classifying the recognized speech into the speech category and a speech subcategory, and evaluating the relevance between the recognized speech and the topic of interest by comparing the interest category and the speech category.

11. The method of claim 10, further comprising determining the topic of interest.

12. The method of claim 10, wherein the contextual information comprises either one or both of a schedule of the user and location data.

13. The method of claim 11, wherein the determining of the topic of interest comprises, in response to determining to provide the notification, learning the topic of interest based on the relevance.

14. The method of claim 10, wherein the determining of whether to provide a notification comprises generating text of the recognized speech, and evaluating the relevance between the generated text and the topic of interest.

15. The method of claim 14, wherein the evaluating of the relevance comprises applying either one or both of support vector machine (SVM) classification or neural network classification to classify the generated text, and evaluating the relevance between a classification result and the topic of interest.

16. The method of claim 14, wherein the evaluating of the relevance between the text and the topic of interest is performed based on any one or any combination of any two or more of presence or absence of a user keyword in the generated text, a number of user keywords in the generated text, or a number of words in the generated text relating to the user keyword.

17. The method of claim 10, wherein the notification message is outputted in any one or any combination of any two or more of the following forms: text, a voice, a vibration, or an alerting sound.

18. The method of claim 10, further comprising:
translating a language of the recognized speech into a language designated by the user for evaluation of the relevance in the designated language, or translating the notification into the designated language after evaluation of the relevance in the language of the recognized speech.

19. A method for selective notification, to a user, of detected relevant speech, comprising:
executing a processor to actuate a microphone;
determining whether a volume of a sound detected by the microphone exceeds a threshold;
detecting, by the microphone, speech, in response to the volume of the sound exceeding the threshold;
storing, in a memory, the speech detected by the microphone;
transforming the captured speech, via a voice recognizer, into text;
classify the text into a speech category;
determining a relation between the text and a pre-established user keyword;
determining a category of the text and a priority level of the category; and
selectively transmitting an alert to a user, wherein a type of the alert is selected based on the determined relation, the determined category, and the determined priority level of the category,
wherein the method further comprises determining a topic of interest by analyzing contextual information of the user, classifying the contextual information into an interest category and an interest subcategory, classifying the text into the speech category and a speech subcategory, and evaluating the relevance between the text and the topic of interest by comparing the interest category and the speech category.

20. The method of claim 19, further comprising:
generating a network of related words based on the pre-established user keyword; and,
determining a relation between the text and the network of related words.

21. The method of claim 20, wherein the network is a neural network.

22. The method of claim 21, further comprising transforming one of the text or the user keyword from a first language into a second language for comparison to determine the relation between the text and the pre-established keyword.

23. A speech notification method, comprising:
classifying a recognized speech into a speech category;
determining a topic of interest of a user based on contextual information associated with the user;
classify the contextual information into an interest category and an interest subcategory;
classify the recognized speech into the speech category and a speech subcategory;
evaluating a relevance between the recognized speech and the topic of interest by comparing the speech category and the interest category;
in response to determining to provide a notification to the user based on the relevance, selecting a notification method based on a determined priority level of the speech category; and
providing, to the user, a notification message based on the selected notification method.

24. The method of claim 23, wherein the contextual information is generated by extracting user keywords from any one or any combination of two or more of schedules, address books, memos, text messages, emails, social media posts, calendars, other personal sources, and searched keywords, or by extracting keywords related to current location data for the user.

* * * * *